Oct. 1, 1963 W. A. RAY 3,105,513
SWING CHECK TYPE REGULATOR VALVE
Filed May 28, 1959

INVENTOR.
WILLIAM A. RAY
BY Lyon & Lyon
ATTORNEYS.

United States Patent Office 3,105,513
Patented Oct. 1, 1963

3,105,513
SWING CHECK TYPE REGULATOR VALVE
William A. Ray, North Hollywood, Calif., assignor to General Controls Co., Glendale, Calif., a corporation of California
Filed May 28, 1959, Ser. No. 816,507
16 Claims. (Cl. 137—484.8)

The present invention relates to gas pressure regulators for controlling the flow of fluids.

Briefly, the present invention contemplates a gas regulator for maintaining a constant outlet pressure of the fluid flowing therethrough which increasing fluid demands. This is accomplished by means of a regulating valve which comprises a valve member movable by a diaphragm member mounted in a chamber. The diaphragm member has acting on one side thereof an adjustable spring acting on the diaphragm in such a direction as to tend to cause the valve to open. There is a diaphragm chamber on the other side of the diaphragm and increased pressure in said diaphragm chamber tends to close the valve. In order to render the regulator sensitive to rate of fluid flow therethrough, there is provided means illustrated in the form of a Pitot tube for decreasing the pressure in said diaphragm chamber in accordance with increased flow so that the valve tends to move towards its fully open position with increased fluid flow.

An object of the present invention is to provide an improved gas regulator which is used in gas supply lines for supplying gas to such devices as furnaces, stoves, refrigerators and the like, for the purpose of automatically maintaining substantially constant inlet pressures to the device despite rather wide variations in the pressure to the supply lines.

Another object of the present invention is to provide an improved gas regulator involving the use of a pivoted valve element which is automatically moved to different positions depending both on the pressure head and velocity head of gas flowing through a valve casing.

Another object of the present invention is to provide an improved gas regulator in which a diaphragm operates a movable valve member in accordance with pressures sensed by a Pitot tube.

Another object of the present invention is to provide an improved gas regulator in which a Pitot tube cooperates in a novel manner with respect to a movable valve element which has its position controlled in accordance with pressure sensed by such Pitot tube.

Another object of the present invention is to provide an improved gas regulator in which a movable valve element is more positively controlled in accordance with the velocity head, i.e. in accordance with the rate at which gas flows through a valve casing.

Another object of the present invention is to provide an improved gas regulator in which a Pitot tube is positioned in a unique manner with respect to a movable valve element which is controlled in accordance with the pressure, both pressure head and velocity head, sensed by such Pitot tube.

Another object of the present invention is to provide an improved arrangement as indicated in the previous paragraph featured by the fact that the Pitot tube is moved when and as the movable valve element is moved.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
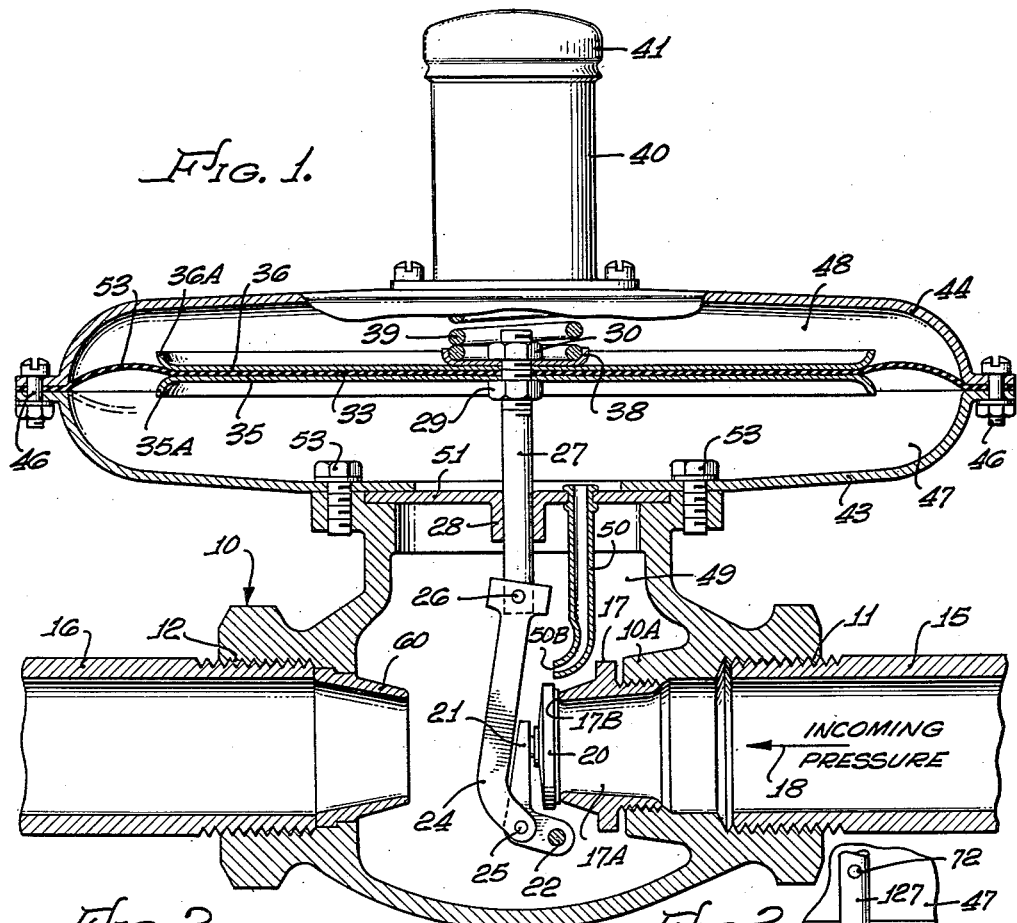
FIGURE 1 is a view partly in elevation and mainly in section of an improved gas regulator embodying features of the present invention.

Referring to the drawings, the gas regulator incorporates a valve casing 10 having aligned gas inlet and gas outlet threaded openings 11 and 12 for threadedly receiving respectively a supply pipe or line 15 and a pipe or line 16 extending to an appliance, heater or the like. It is noted that these two threaded openings 11 and 12 are axially aligned.

A nozzle 17, which is essentially in the form of an externally threaded bushing, is threaded in an inwardly extending cylindrical portion 10A of casing 10. It is noted that this nozzle 17 has a cylindrical opening 17A which tapers inwardly in the direction of gas flow, such gas flow being indicated by the arrow 18. The outer peripheral edge 17B of the nozzle 17 serves as a valve seat for the movable valve element 20, such valve element 20 being essentially a pivoted check valve member loosely mounted on arm 21. This arm 21 is mounted for pivotal movement about a fixed pivot pin 22 which is suitable anchored on the valve casing 10; and an intermediate portion of such lever 21 is connected to one end of the link 24 by pin 25, the other end of the link 24 being similarly pin-connected by pin 26 to the lower end of shaft 27 which is slidably mounted in a bearing member 28. The upper end of such shaft 27 is threaded and nuts 29 and 30 thereon serve to fasten the same with respect to the central portion of the flexible diaphragm 33.

For these latter purposes, the central portion of diaphragm 33 is sandwiched between two metal discs 35, 36 having outwardly turned peripheral edges indicated at 35A and 36A, and the nuts 29 and 30 are on opposite sides of an assembly comprising, in turn, the disc 35, the diaphragm 33, the disc 36 and the metal seat 38 for an adjustable compression spring 39. The compressive force exerted by the spring 39 may be adjusted using conventional techniques and the same may involve the use of a nut threaded in the cylindrical spring housing 40 to which access may be had after removing the removable cover member 41.

The peripheral edge of the diaphragm 33 is sandwiched or clamped between adjacent flanges of dished casing members 43 and 44 using a series of clamping bolts 46 for that purpose. This casing member 43 defines with the diaphragm 33 the chamber 47 and similarly the other casing member 44 defines with the upper surface of diaphragm 33 the chamber 48. This chamber 47 is in communication with the chamber 49 defined by casing 10 through a Pitot tube 50.

For this latter purpose the Pitot tube 50, as shown in FIGURE 1, is affixed to and extends through the annular plate 51 which has the integrally formed bearing portion 28. This member 51 is secured by bolts 53 to the casing 40 and the casing member 43.

Figure 2:
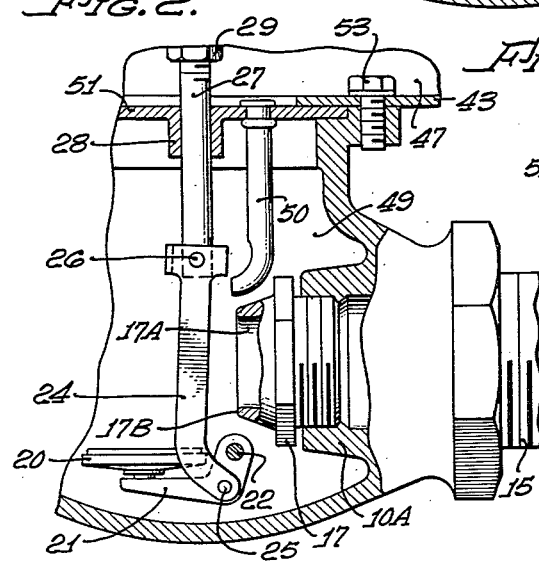
FIGURE 2 illustrates a portion of the gas regulator shown in FIGURE 1 in which, in this case, the valve element is in its extreme open position.

In operation of the gas regulator shown in FIGURES 1 and 2, the diaphragm 33 is initially stressed as illustrated, i.e. bowed upwardly by gas pressure existing in the diaphragm chamber 47, against the action of compression spring 39 which serves as an adjustable counterbalancing spring. It is noted, of course, that when the pressure in chamber 47 tends to increase as a result of, for example, an incremental increase in pressure in the outlet conduit 16, the diaphragm 53 is moved further upwardly against the action of spring 39 and that the valve element 20 is moved closer to its fully closed position to further restrict the flow and consequently decrease the original assumed incremental increase in pressure in conduit 16. In other words, the net result is that the diaphragm 33 due to fluid pressure acting thereon urges the rod 27 upwardly to cause the swing or pivoted valve element 20 to move towards its closed position against the annular valve seat 17B and to maintain the pressure in the outlet line 16 substantially constant. In accomplishing this result the valve element 21 pivots clockwise about the fixed pivot pin 22 and, indeed, the diaphragm 33 may maintain such valve 20, 17B closed when either there is no pressure in the inlet line 15 or such pressure is below a predetermined minimum value so long as the pressure in the chamber 47 is sufficiently large to move the valve to closed position as, for example, when the flow from outlet line 16 is cut off and the pressure in supply line 15 for some reason or other drops. It should be noted that the position of the valve element 20 is dependent on the forces acting thereon and these include the resultant of different forces as, for example, the adjusted condition of spring 39, and the difference in pressure between, on the one hand the pressure in chamber 49 and the pressure in line 15.

In such case, in the assumed closed condition of valve element 20 when the pressure in line 15 subsequently becomes sufficiently large to overcome the pressure existing in the valve chamber 49, then the valve member 20 is pivoted or swung about its pivot 22 to open the valves 20, 17B.

This valve is opened in increased amounts depending on conditions existing in the valve chamber 49 and more particularly, the pressure conditions existing at the opening 50B of the Pitot tube. Such opening 50B is, as shown in FIGURE 1, directed generally in the same direction as nozzle 17 and spaced a slight distance above the same so that at least the initial jet of gas flowing through nozzle 17 is deflected by the valve element 20 in the direction of the mouth or opening of Pitot tube 50.

This Pitot tube 50 senses a pressure which, in general, is the difference between the static pressure in chamber 49 and the pressure resulting from fluid flow, i.e. pressure corresponding to velocity head.

It will thus be seen that the initial surge of gas from nozzle 17, resulting from, for example, opening a valve (not shown) in the outlet line 16, causes a pressure build-up in chamber 47, and such pressure build-up tends to bow the diaphragm 33 further upwardly against the action of spring 39; and consequently the valve element 20 tends to move towards its valve closing position. However, this tendency for the valve element 20 to move towards its closed position is counteracted by the pressure developed due to fluid flow, i.e. velocity head. In other words, there is an aspirating effect in chamber 49 between the inlet nozzle 17 and a similar outlet nozzle 60 also extending into chamber 49. These two nozzles 17, 60, each having aligned passageways converging towards each other, may be likened to elements of a venturi section at the throat of which the net pressure head is reduced because of increase in velocity head.

Thus, the Pitot tube 50 senses both a static head and a velocity head to render the diaphragm sensitive to both such that with increased rate of flow the aspirating effect at the sensing end of the Pitot tube becomes greater, the pressure on the diaphragm 47 becomes lessened and the valve element 20 moves further towards its fully open position in accordance with increased fluid rates. Perhaps the following explanation will clarify the desirability of this result. The pressure in the outlet line 16 is equal to the pressure in the inlet line 15 minus the pressure drop through the regulating valve. Drawing an analogy to an electrical circuit, the pressure drop (voltage drop) is equal to the current times the resistance, i.e. rate of flow times the resistance to such fluid flow. By decreasing the resistance to fluid flow in accordance with increase in fluid flow, the product of resistance times rate of flow tends to remain constant, i.e. the pressure drop through the regulating valve tends to remain constant. Since such pressure drop tends to remain constant, the pressure in the outlet line tends to remain constant.

Thus, increased fluid flow through chamber 49 results in decreased pressure in chamber 47 with the result that the valve 20 is moved further towards its fully open position shown in FIGURE 2 by the action of spring 39 so that the valve element 20 produces a smaller amount of resistance to fluid flow with increased fluid flow. This means that the pressure drop between conduits 15, 16, i.e. across the regulating valve, changes with velocity of fluid flow such that the pressure in the conduit 16 tends to be maintained constant. In other words, the pressure drop across the valve is so regulated that it is made relatively insensitive to velocity of gas flow.

Figures 3, 4:
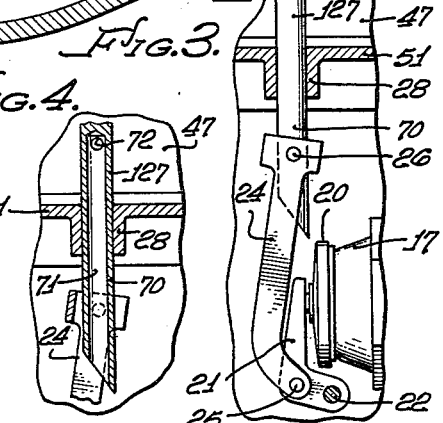
FIGURE 3 illustrates a modified construction in which a Pitot tube is movable.
FIGURE 4 illustrates some of the elements shown in FIGURE 3 in section.

In the modification shown in FIGURES 3 and 4, the Pitot tube 70 is formed in the shaft or rod 127 which performs the same functions of the corresponding rod 27 in FIGURE 1. Thus, the rod 127 has an open-ended bore 71 which terminates at its lower end at the lower beveled portion of the rod 127 to achieve substantially the same effect of a bent tube as in FIGURE 1. This bore 71 is in communication with the chamber 47 through a radially extending apertured portion 72. Otherwise, this modified rod 127 is connected to the diphragm 33 and link 24 and is slidably mounted in bearing 28 as is the corresponding rod 27 in FIGURE 1. In this case it will be observed that the lower end or opening of the Pitot tube 70 in FIGURES 3 and 4 is movable with the valve element 20 and is moved closer to the common axis of the two nozzles 17, 60 when and as the valve 20 is opened. Further, in this case there is no initial deflection of the gas stream by the valve 20 onto the Pitot tube 70 as is the case in FIGURE 1 described above.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A gas regulator comprising, a valve body having a valve chamber, said body having inlet and outlet openings, said openings being substantially on a common axis and being defined by two axially aligned nozzles each having convergent fluid flow sections, a movable valve element cooperating with one of said valve openings to regulate the flow of fluid through said chamber, a diaphragm responsive to gas pressure in said valve body for moving said valve element towards closed position in accordance with increased pressure in said valve body, and nozzle means having an opening adjacent said movable valve element for developing a pressure responsive to velocity of fluid flow between said nozzles and at said movable valve element for reducing the gas pressure on said diaphragm in accordance with increased gas flow.

2. A gas regulator comprising, a valve body having a valve chamber, said body having inlet and outlet openings, said openings being substantially on a common axis, a valve element pivoted on said body for closing one of said openings, diaphragm means for moving said valve element towards closed position in accordance with increased pressure in said valve body, a Pitot tube having its inlet positioned adjacent the pivoted valve and sensitive to velocity of fluid at said pivoted valve element and flowing between said openings and developing a pressure which is applied to said diaphragm to operate said valve element in accordance with the velocity of fluid flow between said openings.

3. A regulator as set forth in claim 2 in which said Pitot tube has its opening positioned such that in initial opening of said movable valve element the fluid is deflected from said valve element into said Pitot tube opening.

4. A regulator as set forth in claim 2 in which means are incorporated for moving said Pitot tube with said diaphragm.

5. A gas regulator comprising a valve body having a valve chamber, said body having inlet and outlet openings, each of which are spaced from each other and which define generally a venturi section, a valve element movable with respect to one of said openings for controlling the flow of fluid therethrough, diaphragm means for operating said movable valve element towards closed position in accordance with increased pressure in said valve body and means positioned adjacent said movable valve element and sensitive to the rate of flow in said venturi section for lessening the pressure on said diaphragm and moving said valve element towards its fully open position.

6. A gas regulator comprising a valve body having a valve chamber, said body having inlet and outlet openings, said openings being substantially on a common axis, a valve element pivotally mounted on said body in said casing and with respect to one of said openings, said one opening serving as a valve seat for said valve element, a diaphragm for moving and positioning said movable valve element relative to said one valve opening so that the position of said valve element is automatically determined by the increased pressure in said valve body exerted on said diaphragm, and a Pitot tube in said chamber positioned adjacent said movable valve element to sense pressure corresponding to velocity of fluid flow at said movable valve element and between said openings, and said diaphragm being sensitive and movable in accordance with said pressure.

7. A gas regulator comprising a valve body having a valve chamber, said body having inlet and outlet openings, said openings being substantially on a common axis and being defined by a pair of nozzles having fluid flow converging passages therethrough converging one towards the other, a valve element movably mounted with respect to one of said openings, diaphragm means responsive to gas pressure in said valve body for moving said valve element towards closed position in accordance with increased pressure in said valve body and means mounted adjacent said valve element and responsive to the rate of flow between said converging passages and at said valve element for operating said movable valve element towards its fully open position in accordance with increased rate of flow by reducing the pressure on said diaphragm means.

8. A regulator as set forth in claim 7 in which the last mentioned means comprises a Pitot tube sensitive to velocity head of fluid flow between said openings.

9. A regulator as set forth in claim 8 in which said Pitot tube has its opening extending generally in the direction of fluid flow.

10. A regulator as set forth in claim 9 in which said Pitot tube opening is positioned such that upon initial movement of said valve element from its opening position fluid is deflected from said movable element into the opening of said Pitot tube.

11. A regulator as set forth in claim 9 in which means are provided for moving said Pitot tube jointly with said valve element.

12. A gas regulator comprising a valve body having a valve chamber, said body having inlet and outlet openings, said openings being substantially on a common axis and being defined by a pair of nozzles, the downstream nozzle being convergent with respect to fluid flow and the upstream nozzle being divergent with respect to fluid flow, said nozzles terminating in said valve chamber and being spaced one from the other, a valve element pivotally mounted on said body for movement in the space between said nozzles and into engagement with an end of the upstream nozzle, a casing, a diaphragm mounted on said casing and forming a movable wall of a chamber, connecting means including a pivoted link between said diaphragm and said valve element for moving said valve element in accordance with the pressure in said chamber, a Pitot tube having one of its ends in communication with said chamber and the other one of its ends positioned in the space between said nozzles and in close proximity to said pivoted valve element to develop a pressure which is indicative of the velocity head of fluid flow at said valve element and between said nozzles.

13. A regulator as set forth in claim 12 in which one end of said Pitot tube is positioned generally in the space between said nozzles and closer to the downstream nozzle than the upstream nozzle.

14. A regulator as set forth in claim 13 in which the pressure-sensing opening of said Pitot tube is directed generally in the direction of fluid flow.

15. A regulator as set forth in claim 14 in which said opening of said Pitot tube is positioned adjacent said movable valve element so that upon initial opening of said valve element fluid is deflected by said valve element into said Pitot tube opening.

16. A regulator as set forth in claim 15 in which means are provided for moving said Pitot tube with said diaphragm.

References Cited in the file of this patent

UNITED STATES PATENTS

| 114,804 | Guild | May 16, 1871 |
| 2,239,116 | Ray | Apr. 22, 1941 |
| 2,263,581 | Hughes | Nov. 25, 1941 |
| 2,294,314 | McKinley | Aug. 25, 1942 |

FOREIGN PATENTS

| 541,311 | Germany | Jan. 6, 1932 |
| 1,037,521 | France | Sept. 17, 1953 |